United States Patent Office 3,036,119

Patented May 22, 1962

1

2

3,036,119

PREPARATION OF LOW MOLECULAR WEIGHT ORGANIC ESTERS

Theodore Augur Koch, Glen Mills, Pa., and Ivan Maxwell Robinson, Wilmington, Del., assignors to E. I. du Pont de Nemours and Company, Wilmington, Del., a corporation of Delaware No Drawing. Filed Oct. 1, 1959, Ser. No. 843,639
14 Claims. (Cl. 260—486)

This invention relates to a process for preparing organic esters, and more particularly to a process for preparing low molecular weight organic esters of monocarboxylic acids from monoesters of dicarboxylic acids.

Low molecular weight organic esters may be prepared in a variety of ways. Acrylic esters have received special attention due to their usefulness as monomers to prepare solid thermoplastics. One method of preparation involves the carbonylation of acetylene. Another method which has been proposed involves preparing acrylic acid by pyrolysis of maleic acid in the presence of steam and subsequently esterifying the recovered acrylic acid. This latter method has not achieved commercial importance.

It is an object of this invention to provide a method of preparing low molecular weight esters of monocarboxylic acids from monoesters of unsaturated dicarboxylic acids. It is another object of this invention to provide a process which produces said esters of monocarboxylic acids in high yields over a wide range of conversions. It is a further object of this invention to provide a process which produces said esters of monocarboxylic acids in a very pure state. It is still another object of this invention to provide an economical method of producing acrylic esters. Other objects will appear hereinafter.

The objects of this invention are accomplished by contacting at a temperature in the range of 200° C. to 550° C. a monoester of a dicarboxylic acid wherein the ester radical is derived from an alcohol containing 1 to 7 carbon atoms and the acid radical is derived from an acid selected from the group consisting of maleic acid, succinic acid, fumaric acid, mesaconic acid, itaconic acid and citraconic acid with at least one catalytic compound selected from the group consisting of metal phosphates and metal oxides wherein the metal is selected from the group consisting of the metals of groups I–B, II, IV, V–A, VI–B, VII–B and VIII of the periodic table.

In general, the reaction may be carried out by passing the vaporized starting materials over a catalyst bed, condensing the products and separating the products by distillation or the like. For example, methyl acrylate may be prepared from monomethyl maleate using zinc oxide catalyst, according to the following reaction scheme:

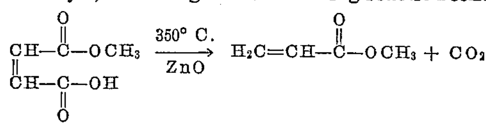

As can be seen from the above equation, the reaction is a decarboxylation of the monoester of the dibasic acid to give the ester of the monobasic acid. If desired, the reaction may be carried out in the presence of excess of such alcohol as was used in the formation of the monoester.

The invention is operable over an extremely broad range of temperature, but it is generally desirable to operate the process at a temperature in the range of 200° C. to 550° C. In a preferred embodiment, the process is carried out at a temperature in the range of 250° C. to 450° C.

Starting materials useful in the process of this invention are prepared from the reaction of an alcohol with a dicarboxylic acid or anhydride. Useful alcohols include methanol, ethanol, 1-propanol, 1-butanol, cyclohexanol and benzyl alcohol. Useful acids include maleic-, succinic-, fumaric-, mesaconic-, itaconic- and citraconic-acid. Those acids which form anhydrides may also be used in the anhydride form to prepare the starting materials.

Compounds useful as catalysts for this process include the oxides and phosphates of the metals of groups I–B, II, IV, VA, VI–B, VII–B and VIII of the periodic table as illustrated on page 573 of General Inorganic Chemistry by Sneed and Maynard, published by D. Van Nostrand Company, New York (1942). As used herein, the metals of group II–A include Be, Mg, Ca, Sr, Ba and Ra; the metals of group IV–A include Ge, Sn and Pb; the metals of group V–A include Sb and Bi; the metals of group I–B include Cu, Ag and An; the metals of group II–B include Zn, Cd and Hg; the metals of group IV–A include Ti, Zr and Hf; the metals of group VI–B include Cr, Mo and W; the metals of group VIII include Fe, Ru, Os, Co, Ra, Ir, Ni, Rd and Pt. If desired, a mixture of two or more of the oxides or phosphates of these metals can be employed. It is also convenient, but not necessary, to employ an inert support for the metal oxide or phosphate. Many of the catalyst supports known in the art such as, for example, alumina, silica gel, quartz and the like may be employed. The preferred phosphates and oxides are those of Zn, Co, Cr, Mg, Mn, Fe, Ni and Cu.

The method of contacting the catalyst and starting material is not critical, and any of the methods known in the art for contacting a fluid and a solid are generally useful. The contact times for this reaction can be varied over an extremely broad range, the preferred range being 0.2 sec. to 300 sec. Contact times to achieve the same conversion decrease with increasing temperature. Optimum conditions of temperature and contact time to result in the most desirable combination of yield and conversion will differ for any given reactor, but can be easily determined by those skilled in the art.

The pressure at which the reaction is carried out is not critical. It is preferred to carry out the reaction at ambient atmospheric pressure, but subatmospheric pressure or superatmospheric pressure may be employed if desired.

In order to more clearly illustrate our invention, the preferred modes of carrying out the same, and the advantageous results to be obtained thereby, the following examples are included. Unless otherwise stated, all parts and percentages herein are by weight.

As used herein, the terms "percent yield," "percent conversion" and "percent production" mean:

Percent conversion $$=\frac{\text{total moles of starting materials converted to products}}{\text{total moles of starting material supplied}}\times 100$$

Percent yield $$=\frac{\text{moles of the given product}\times\text{moles of starting material theoretically required to form one mole of the given product}}{\text{total moles of starting material converted to products}}\times 100$$

$$\text{Percent production}=\frac{\text{percent yield}\times\text{percent conversion}}{100}$$

EXAMPLES I TO XXVII

The starting material, shown in the table below, was contacted with the catalyst by permitting the starting material to flow from a dropping funnel into the top of a vertical tube packed with quartz and the catalyst. The tube, 30 inches long and 22 mm. inside diameter, was made of high-silica glass. The upper 10 inches of the tube were packed with 2 to 4 mesh quartz and immediately below the quartz was placed a 10 inch bed of the catalyst indicated. The tube was suspended in a vertical electric furnace. Reaction temperature was measured by means of a thermocouple attached to the outside of the tube. As the starting material contacted the quartz packing, it was vaporized and heated to the desired reaction temperature. The vaporized material was passed through the catalyst bed where the reaction occurred. A nitrogen carrier gas at the rate of 10 to 100 mil./min. was fed into the reaction tube along with the starting materials to aid in passing the reactants through the catalyst bed. The products and the unreacted starting materials were passed into a water cooled condenser, condensed, and collected in a receiver. Uncondensed materials were vented with the carrier gas.

Catalysts used in the examples illustrated in the table were generally used on a support. Metal phosphates were applied to the support as an aqueous solution. Alternately, the phosphate catalysts may be prepared by double impregnation of the support by a soluble salt of the metal followed by treatment with a solution of ammonium phosphate. The water was driven off by heating at 250° C. for 2 hours. Metal oxide catalysts were prepared by applying a water soluble metal salt to the support and converting the salt to the oxide in situ. When metal chloride solutions were used, the chloride was converted to the oxide by washing with ammonium hydroxide and subsequent heating at 250° C. for 2 hours. When metal nitrate solutions were used, the nitrate was converted to the oxide by heating at 400° C. to 500° C. for 2 hours.

A summary of the results of Examples I to XXVII appears in Table I. Column 2 gives the starting material and column 10 gives the major product. Other columns list reaction conditions, catalysts and the like, as indicated. In some of the examples, the reaction was carried out in the presence of excess alcohol used to form the ester.

By comparing Examples I to XXIV and Examples XXV to XXVII, it is apparent that a catalyst is required to affect the reaction. The examples further show that the process is operable over an extremely wide range of temperatures and contact times to give excellent yields. The products which were obtained contained only trace amounts of impurities. Since the starting material can be separated from the products very easily, it is apparent that the process can be used to prepare extremely pure products without further purification.

Substantially the same results are obtained as in Examples I to XXIV by substituting as a catalyst other metal oxides or phosphates of the metals of groups I–B, II, IV, V–A, VI–B, VII–B and VIII of the periodic table. Substantially the same results are also obtained by substituting as a starting material in Examples I to XXIV a monoester of a dicarboxylic acid which is derived from an alcohol containing 1 to 7 carbon atoms and maleic acid, succinic acid, fumaric acid, mesaconic acid, itaconic acid or citraconic acid. While a catalyst support is not necessary, it is desirable to employ a support, since it provides a catalyst bed with good physical properties and generally permits the use of a smaller amount of catalytic material.

The foregoing examples are not intended as limiting the scope of the present invention, but are only illustrations thereof. It should be apparent that the process is very versatile, and many modifications will be apparent to one skilled in the art without departing from the spirit of the invention. Thus, although the examples show the use of approximately ambient atmospheric pressure, it is clear that the reaction can be carried out at subatmospheric or superatmospheric pressure if desired. Mixtures of metal oxides and phosphates may be used if desired. In general, it is not necessary that the catalyst be of high purity. The presence of small amounts of impurities does not materially affect the reaction. Likewise, it is not necessary that the starting material be of high purity.

*Table I*

| Ex. | Starting material | Mol ratio alcohol ester | Catalyst conc. based on weight of support | Catalyst preparation | Reaction temp., ° C. | Contact time, sec. | Main product | Percent production | Percent yield |
|---|---|---|---|---|---|---|---|---|---|
| 1 | Monomethyl maleate in methanol | 11.3 | 10% BaO, 2.5% CuO on silica gel | 14.20 mesh silica gel impregnated with nitrate salts | 250 | 20 | Methyl acrylate | 89 | >90 |
| 2 | do | 11.3 | do | do | 300 | 1.8 | do | 14 | |
| 3 | do | 11.3 | 10% CuO on silica gel | Impregnated with $Cu(NO_3)_2$ | 450 | 8 | do | 18 | |
| 4 | do | 11.3 | 10% $FePO_4$ on silica gel | Impregnated with $Fe(NO_3)_3$ then treat with ammonium phosphate | 390 | 55 | do | 92 | >90 |
| 5 | do | 3.6 | do | do | 390 | 25 | do | 52 | |
| 6 | Monoethyl maleate | 8.4 | do | do | 400 | 32 | Ethyl acrylate | 17.5 | |
| 7 | Monomethyl maleate | 11.3 | 10% $Ca_3(PO_4)_3$ on silica gel | Impregnate gel with $Ca(NO_3)_2$ followed by ammonium phosphate | 300 | 8 | Methyl acrylate | 11 | |
| 8 | do | 8.4 | 10% $Fe_3(PO_4)_2$+1% $Ba_3(PO_4)_2$ on silica gel | Impregnate with $Ba(NO_3)_2$ and $FeCl_2$, followed by phosphate treatment | 350 | 25 | do | 36 | |
| 9 | do | 11.3 | 10% $Fe_2O_3$ on silica gel | Impregnate with $FeCl_3$ followed by treatment with $NH_4OH$ sol'n | 400 | 4 | do | 9 | <70 |
| 10 | do | 16.65 | 10% CdO on silica gel | As in 9, using $CdCl_2$ | 400 | 40 | do | 25 | |
| 11 | do | 16.65 | 10% $ZnO(PO_4)_2$ on silica gel | As in 4, using $Zn(NO_3)_2$ sol'n | 350 | 12 | do | 29 | |
| 12 | do | 16.65 | 10% ZnO on silica gel | As in 9, using $ZnCl_2$ sol'n | 350 | 40 | do | 99 | >95 |
| 13 | do | 16.65 | do | Impregnate with $Zn(NO_3)_2$ and calcine in ZnO | 350 | 20 | do | 72 | >85 |
| 14 | do | 13.4 | do | As in 12 above | 250 | 130 | do | 80 | 90 |
| 15 | do | 13.4 | 10% $Ba_3(PO_4)_2$ on silica gel | As in 4, using $Be(NO_3)_2$ | 300 | 12 | do | | |
| 16 | do | 13.4 | 10% MnO on silica gel | As in 9, using $MnCl_2$ | 300 | 30 | do | 43 | |
| 17 | do | 13.4 | 10% NiO on silica gel | As in 9, using $NiCl_2$ | 275 | 30 | do | 43 | 80 |
| 18 | do | 13.4 | 10% CoO on silica gel | As in 9, using $CoCl_2$ | 275 | 16 | do | 97 | >95 |
| 19 | do | 13.4 | $TiO_2$, no support | By hydrolysis of $Ti(SO_4)_2$ | 350 | 20 | do | 7 | |
| 20 | do | 13.4 | 10% $Cr_2O_3$ on silica gel | Impregnate with $Cr_2O_3$ sol'n | 250 | 20 | do | 90 | 90 |
| 21 | do | 13.4 | 10% MgO on silica gel | As in 9, using $MgCl_2$ | 325 | 12 | do | 68 | |
| 22 | Monomethyl citraconate | 17.0 | 10% $Fe_3(PO_4)_2$ on silica gel | As in 4 above | 450 | 22 | Methyl methacrylate | 10 | |
| 23 | Monomethyl succinate | 15.3 | do | do | 400 | 16 | Methyl propionate | 9 | |
| 24 | Monomethyl maleate | 1.01 | 10% ZnO on silica gel | As in 9, using $ZnCl_2$ | 300 | 40 | Methyl acrylate | 34 | |
| 25 | do | 11.3 | 30% $KH_2PO_4$ on silica gel | Impregnate gel with $KH_2PO_4$ sol'n | 400 | 8 | do | $<2$ | |
| 26 | do | 16.65 | 100% silican carbide | | 350 | 22 | do | $<2$ | |
| 27 | do | 16.65 | 10% KCl on silica gel | As in 24, using KCl sol'n | 300 | 30 | do | $<2$ | |

The presence of large amounts of water may, however, lead to the formation of acids instead of the corresponding ester.

The process of the present invention is useful in producing methyl acrylate, ethyl acrylate, methyl methacrylate, ethyl methacrylate, methyl propionate and ethyl propionate in commercial quantities. The acrylates and methacrylates are useful in the production of high molecular weight polymers which have many well-known industrial applications. Acrylates and methacrylates are also useful in the manufacture of coatings, lacquers, glazing and the like. The propionates have a variety of uses including use as intermediates to make sodium propionate which is employed as a mold inhibitor.

We claim:

1. The process which comprises contacting at a temperature in the range of 200° C. to 550° C. a monoester of a dicarboxylic acid wherein the ester radical is derived from a saturated hydrocarbon alcohol containing 1 to 7 carbon atoms and the acid radical is derived from an acid selected from the group consisting of maleic acid, succinic acid, fumaric acid, mesaconic acid, itaconic acid and citraconic acid with at least one catalytic compound selected from the group consisting of metal phosphates and metal oxides wherein the metal is selected from the group consisting of metals of groups I–B, II, IV, V–A, VI–B, VII–B and VIII of the periodic table in the presence of an excess of said alcohol and recovering an ester of a monocarboxylic acid.

2. The process of claim 1 wherein the process is carried out at a temperature in the range of 250° C. to 400° C.

3. The process of claim 1 wherein the catalytic compound is an oxide of a group II metal.

4. The process for preparing methyl acrylate which comprises contacting at a temperature in the range of 250° C. to 400° C. monomethylmaleate with zinc oxide in the presence of excess methanol and recovering methyl acrylate formed thereby.

5. A process for preparing methyl acrylate which comprises contacting at a temperature in the range of 250° C. to 400° C. monomethyl maleate with magnesium oxide in the presence of excess methanol, and recovering methyl acrylate formed thereby.

6. A process for preparing methyl acrylate which comprises contacting at a temperature in the range of 250° C. to 400° C. monoethyl maleate with barium oxide in the presence of methanol, and recovering methyl acrylate formed thereby.

7. The process of claim 1 wherein the catalytic compound is an oxide of a group VIII metal.

8. A process for preparing methyl acrylate which comprises contacting at a temperature in the range of 250° C. to 400° C. monomethyl maleate with cobalt oxide in the presence of excess methanol, and recovering methyl acrylate formed thereby.

9. A process for preparing methyl acrylate which comprises contacting at a temperature in the range of 250° C. to 400° C. monomethyl maleate with nickel oxide in the presence of excess methanol, and recovering methyl acrylate formed thereby.

10. A process for preparing methyl acrylate which comprises contacting at a temperature in the range of 250° C. to 400° C. monomethyl maleate with iron oxide in the presence of excess methanol, and recovering methyl acrylate formed thereby.

11. The process of claim 1 wherein the catalytic compound is an oxide of a group VI–B metal.

12. A process for preparing methyl acrylate which comprises contacting at a temperature in the range of 250° C. to 400° C. monomethyl maleate with chromium oxide in the presence of excess methanol, and recovering methyl acrylate formed thereby.

13. The process of claim 1 wherein the catalytic compound is a phosphate of a group XIII metal.

14. A process for preparing methyl acrylate which comprises contacting at a temperature in the range of 250° C. to 400° C. monomethyl maleate with iron phosphate in the presence of excess methanol, and recovering methyl acrylate formed thereby.

No references cited.